June 25, 1957     A. P. R. ROLT ET AL     2,796,943

DRIVE FOR INDEPENDENTLY SUSPENDED VEHICLE WHEELS

Filed Dec. 3, 1953     6 Sheets-Sheet 2

INVENTORS
Anthony P.R.Rolt
Claude Hill
by Carlson, Pitzner, Hubbard & Wolfe
ATTORNEYS June 25, 1957   A. P. R. ROLT ET AL   2,796,943
DRIVE FOR INDEPENDENTLY SUSPENDED VEHICLE WHEELS
Filed Dec. 3, 1953   6 Sheets-Sheet 6

United States Patent Office 2,796,943
Patented June 25, 1957

2,796,943

DRIVE FOR INDEPENDENTLY SUSPENDED VEHICLE WHEELS

Anthony P. R. Rolt, Stratford-on-Avon, and Claude Hill, Kenilworth, England, assignors to Harry Ferguson Research Limited, Stow-on-the-Wold, England, a British company Application December 3, 1953, Serial No. 395,978

Claims priority, application Great Britain December 8, 1952

3 Claims. (Cl. 180—44)

This invention relates to automotive vehicles and, more particularly, to the organization and mounting of means for driving independently suspended wheels from a prime mover or engine.

The general aim of the invention is the provision of a novel organization in an automotive vehicle of prime mover, power transmission, and independent traction wheel suspension means which cooperate substantially to eliminate not only the transfer of vibrations to the frame from either of two sources, viz:

(1) The prime mover and transmission, and
(2) The wheels which are subject to road shock, but also the transfer of vibration from either of those two sources to the other.

In furtherance of that general aim, it is another object to provide an extremely compact power package including an engine and power transmission means mountable as a "unit" on a vehicle frame.

A further object is the provision of novel independent suspension means for steerable traction wheels, the wheels being driven through half axles so arranged as to leave the driving power unit and the driven wheels substantially isolated from one another as regards vibrations.

Still another object is to provide such a compact power unit and vibration-isolating connections thereto for driving all four wheels of a vehicle.

Other objects and advantages will become apparent as the following description proceeds, taken in conjunction with the accompanying drawings, in which:

Figs. 6 and 7 are detail views of resilient means for mounting the power unit on the chassis frame, Fig. 6 showing connections between the engine and frame and Fig. 7 showing connections between the transmission housing and frame.

While the invention has been illustrated and is described in some detail with reference to a particular embodiment thereof, there is no intention that it be thus limited to such detail. On the contrary, it is intended here to cover all alterations, modifications, and equivalents falling within the spirit and scope of the invention as defined by the appended claims.

Referring now to the exemplary vehicle here illustrated, its general organization will first be considered in order to set forth one environment in which the invention finds advantageous use. From the drawings it will be seen that the vehicle chassis comprises a frame 15 from which front and rear pairs of pneumatically tired ground wheels 16, 17 are individually suspended. The front wheels 16 are driven through swingable half axles 20 and are adapted for vertical springing movement and steering in a manner to be described. The rear wheels 17 are driven through swingable half axles 21 independently suspended and sprung, preferably as described and claimed in the copending United States application of Claude Hill, Serial No. 379,571, filed September 11, 1953, and assigned to the assignee of the present invention.

The exemplary vehicle is intended to have four wheel drive, that is, both the front and rear wheels 16 and 17 are traction wheels. To drive all four wheels, an engine 24 and power transmission means are mounted forward on the chassis. Driving connection from the engine to the half axles 20 and 21 is effected in a manner described below.

*Frame construction*

Figure 2:
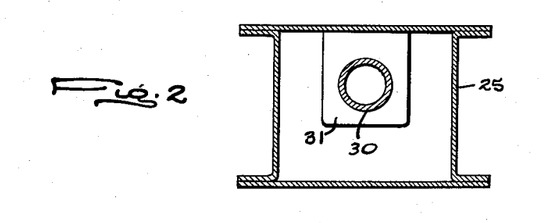
Fig. 2 is a cross-sectional view, taken substantially along the line 2—2 in Fig. 1, of the chassis frame.

While the chassis frame may take any one of a variety of forms, the frame 15 here illustrated comprises a single elongated hollow tube 25 which is box-shaped in cross section. As shown in Fig. 2, the tube 25 may be formed of steel plates suitably welded together, with a series of holes 26 cut at spaced intervals along their length for weight reduction. The frame is bifurcated at either end to afford pairs of longitudinally extending horns 28 which are vertically widened and apertured to accommodate the mounting of the engine and transmission means (at the front) and a rear differential 29, as well as the front and rear suspension assemblies. The drive connection to the rear wheels 17 includes a universally jointed propeller shaft 30 extending aft through the hollow tube 25, the latter thus serving as a protective housing. The intermediate portion of the propeller shaft is journaled in a bearing 31.

The frame also includes transversely extending members 34, 35 welded or otherwise suitably secured across the top of the front and rear horns 28. A radiator 36 for the engine 24 is conveniently located on a shelf 38 extending from the front transverse member 34. The transverse members 34, 35 serve as connection points for wheel suspension springs and at the same time provide flat upper surfaces for receiving a suitable body. Because the details of the vehicle body form no part of the present invention, a body has not been illustrated, although it will be apparent that various types of bodies may be suitably secured to the tops of the transverse members and along the upper surface of the frame's tubular portion 25.

*The power unit*

In modern vehicles the problem is posed of providing a compact arrangement of a prime mover or engine and power transmitting means which will yield a maximum body and passenger space for a given frame size. This becomes particularly acute where the vehicle is to have four wheel drive utilizing, beyond the conventional mechanisms for two wheel drive, a front differential and a third differential. Considerable forward overhang of the engine unduly loads the front wheels and makes steering difficult, while locating the engine directly over the wheels and axles results in an undue limitation of passenger space. In addition to this space problem, it is also necessary for riding comfort that the vehicle frame and body, and indeed the driven wheels, be isolated from the inherent vibrations of an engine and its power transmitting components. Where the driven wheels are independently suspended for enhanced riding performance, it becomes desirable to provide a driving connection between the power unit and the swinging half axles which will not transmit vibrations.

In accordance with the present invention, a compact power unit is formed of the vehicle engine and the necessary power transmitting mechanism so as to be mountable on the chassis frame by resilient means which damp the transfer of vibrations between the unit and the frame. At the same time, however, drive connections are made from the power unit to the independently suspended wheels through half axles coupled such that the unit may "float" relative to the wheels with little transfer of vibration.

As here shown, a power unit 40 (Figs. 1 and 4) embodies within its confines the engine 24, a clutch 41, a speed change transmission 42, a center differential 44, and a front differential 45 all rigidly interconnected for simple and convenient mounting on the frame 15. The unit 40 has three output shafts 46, 47, and 48, the first two extending in opposite transverse directions to drive the front half axles 20 (Fig. 5) and the latter one extending rearwardly for driving connection to the propeller shaft 30 (Fig. 4).

The engine 24 may be of any suitable type, that shown in the present exemplary construction constitutes a flat, opposed cylinder arrangement. The details of the engine may vary considerably and it is believed to be sufficient to note only that the engine presents a rear face through which its output shaft 50 (or crankshaft if it has a crankshaft) extends. To this rear face there is bolted a rearwardly and downwardly extending housing 51 which contains and journals all of the other components for the power unit. This housing 51 may be completely closed and provided with suitable lubricating facilities, the two transverse output shafts 46 and 47 for the front axles and the rear output shaft 48 extending through corresponding openings in the housing which may be provided with lubricant seals.

Figure 4:
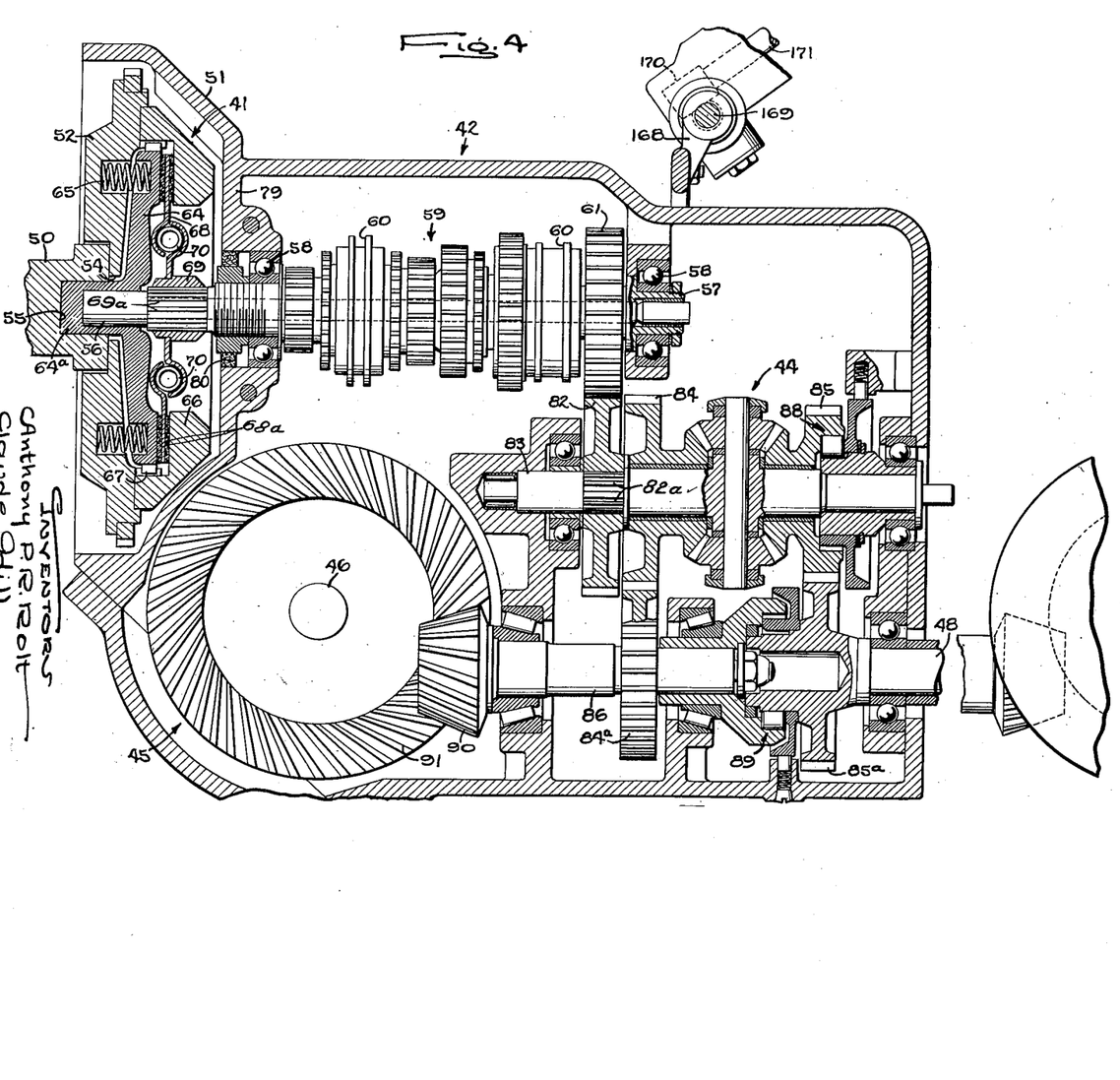
Fig. 4 is an enlarged sectional view taken substantially along the line 4—4 in Fig. 3 and illustrating details of a power unit.

With more particular reference to Fig. 4, the end of the engine's output shaft 50 carries a flywheel 52, the latter being centrally apertured at 54 and the former containing a central recess 55. The clutch 41 is interposed between the flywheel 52 and the transmission 42. The transmission may be of conventional form, and is here shown as having oppositely extending coaxial input and output shafts 56, 57. These are journaled for rotation in ball bearings 58 and carry speed change gears 59 and shifter yokes 60. For shifting the yokes 60, any suitable linkage or shifter fork arrangement (not shown) may be employed. A conventional lay shaft and idler gear for reverse drive (not visible) are horizontally spaced from the input and output shafts to reduce overall height. An output gear 61 of the transmission 42 is carried at the right end of the output shaft 57.

The clutch arrangement includes an axially movable presser plate 64 urged to the right by compression springs 65 interposed between it and the flywheel 52, a hub 64a of the presser plate being axially slidable in the recess 55 of the engine output shaft. A first clutch element 66 is carried by the flywheel and splined at 67 to the periphery of the presser plate 64 so that the two rotate together. A second clutch element 68 is carried by a sleeve 69 splined at 69a to the input shaft 56 for relative axial movement under the control of the presser plate. The second clutch element is formed of two annular, coaxial sections joined by concentric shock-absorbing coil springs 70.

Normally, the springs 65 urge the presser plate 64 to the right to clamp friction layers 68a on the clutch element 68 between the opposed surfaces of the presser plate and the element 66, so that the input shaft 56 is driven by the flywheel 52. Any suitable means may be employed to actuate the clutch for disengaging the drive from the engine 24 to the transmission 42, when the latter is being shifted for example. Compartmental walls or bulkheads 79 may be provided to enclose the clutch assembly and a seal 80, through which the input shaft 56 extends, provided in order that the clutch have a dry casing even though lubricant is present on or circulated over the other components in the housing 51.

The remaining components in the housing 51 may, for example, be constructed and organized in accordance with the four wheel drive system described and claimed in the copending United States application of Claude Hill, Serial No. 360,128, filed June 8, 1953, and assigned to assignee of the present invention. Reference may be had to that copending application for the details of the four wheel drive, and it is believed sufficient to note only that the output gear 61 of the transmission 42 meshes with an input gear 82 made fast as by splines at 82a on a spider shaft 83 of the center differential 44. The center differential 44 has output gears 84 and 85 which drivingly mesh with gears 84a and 85a respectively mounted on a forward drive shaft 86 and the rearwardly extending output shaft 48. Two-way overrun devices indicated generally at 88 and 89 are interposed respectively between the shaft 83 and the differential output gear 85 and between the forward drive shaft 86 and the rear propeller shaft 48. This provides for automatic locking of the drive shaft 86 and the propeller shaft 48 whenever one tends to exceed the speed of the other by predetermined amounts. Thus, traction to all wheels is not lost when one wheel slips or spins, as explained in the above-identified copending application Serial No. 360,128.

It need only be emphasized that the rearwardly extending output shaft 48 is coupled to the universally jointed propeller shaft 30 to drive the rear differential 29, while the forwardly extending drive shaft 86 carries a pinion 90 which drives a ring gear 91 of the front differential 45. As seen best in Fig. 5, the front differential 45 may be of conventional organization having laterally extending output members constituting the two output shafts 46 and 47 of the power unit.

For cushionably mounting the power unit 40 on the frame 15, a plurality of resilient, deformable elements are employed. Two such mounting connections are made from the engine 24 and two from the housing 51 to the forward horns 28. As seen best in Fig. 6, the engine mounting connections each comprises in this instance brackets 100 and 101 which are adapted for bolting respectively to the lower side of the engine 24 and to the frame horns 28. The brackets present parallel, inclined flanges receiving between them a bonded resilient or rubber-like pad 104. The latter may be formed of natural or synthetic rubber, for example, and apertured in registry with holes in the flanges to receive retaining bolts 105. The engine bracket 100 has an arm portion 106 which curves downwardly toward a side portion of the bracket 101. The arm 106 carries a resilient bump pad 108 which is located to cushionably engage the bracket 101 when the pad 104 is compressed a predetermined amount.

It will be clear from the description of these engine mountings that the engine may rock about a longitudinal axis without imparting vibrations directly to the chassis frame. The inclination of the pads 104 is such that lines normal to their surfaces intersect at a point $C_1$ on the fore-and-aft axis about which the power unit oscillates in a transverse plane. Thus, the pads 104 are stressed principally in compression as the unit oscillates. Similarly, up and down movement of the engine is permitted by deformation of the resilient pads 104 which substantially isolate the frame from such vibrations. The resilient pads are sufficiently deformable to cushion vibration between the frame and engine, and in addition, they serve to absorb an appreciable amount of energy to damp such vibrations.

The aft resilient mountings (Fig. 7) comprise brackets 109 and lugs 110 welded respectively to the inner sides of the frame horns 28 and the sides of the housing 51 in locations such that they register when the power unit is mounted. The lug 110 contains a vertical passageway in which is secured a rubber-like sleeve 111 (e. g., natural or synthetic rubber) bounded on the outside by a crimped cup 112 and on the inside by a bushing 114. The bushing seats against a vertically apertured portion 109a of the bracket 109 and is secured in place by a suitable bolt 115. The resilient sleeve 111 thus permits the power unit to "float" relative to the frame 15, absorbing energy and damping vibrations to substantially eliminate the transfer of vibrations from the housing 51 to the frame.

Figure 7:
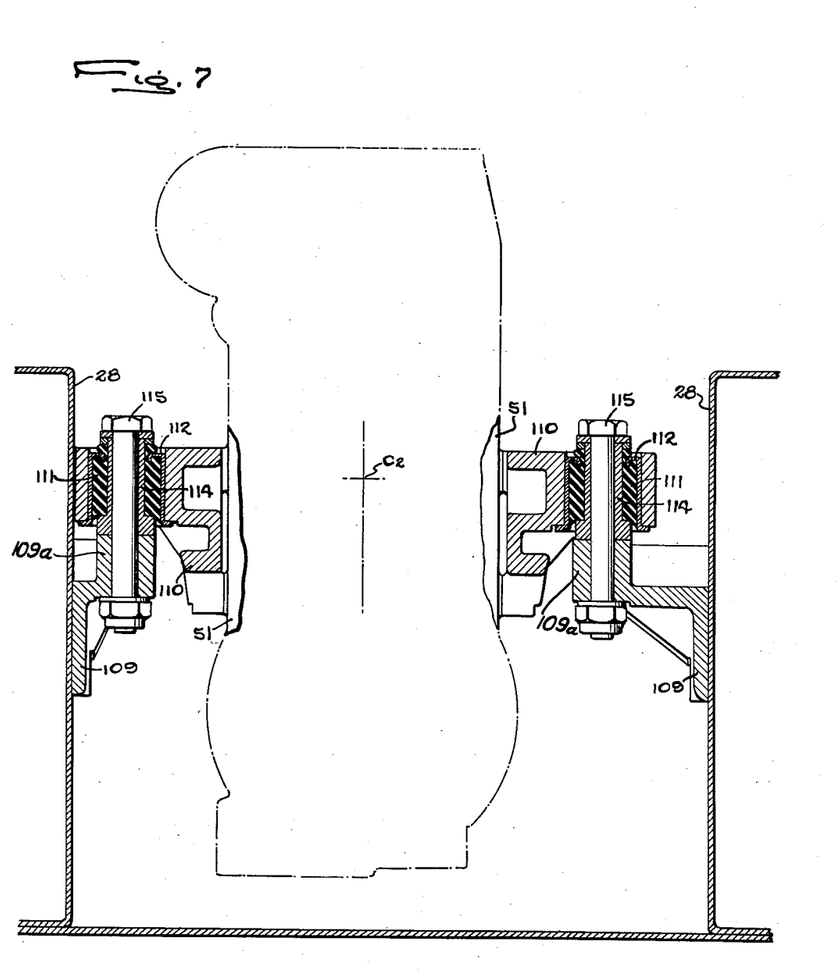
Figure 9:
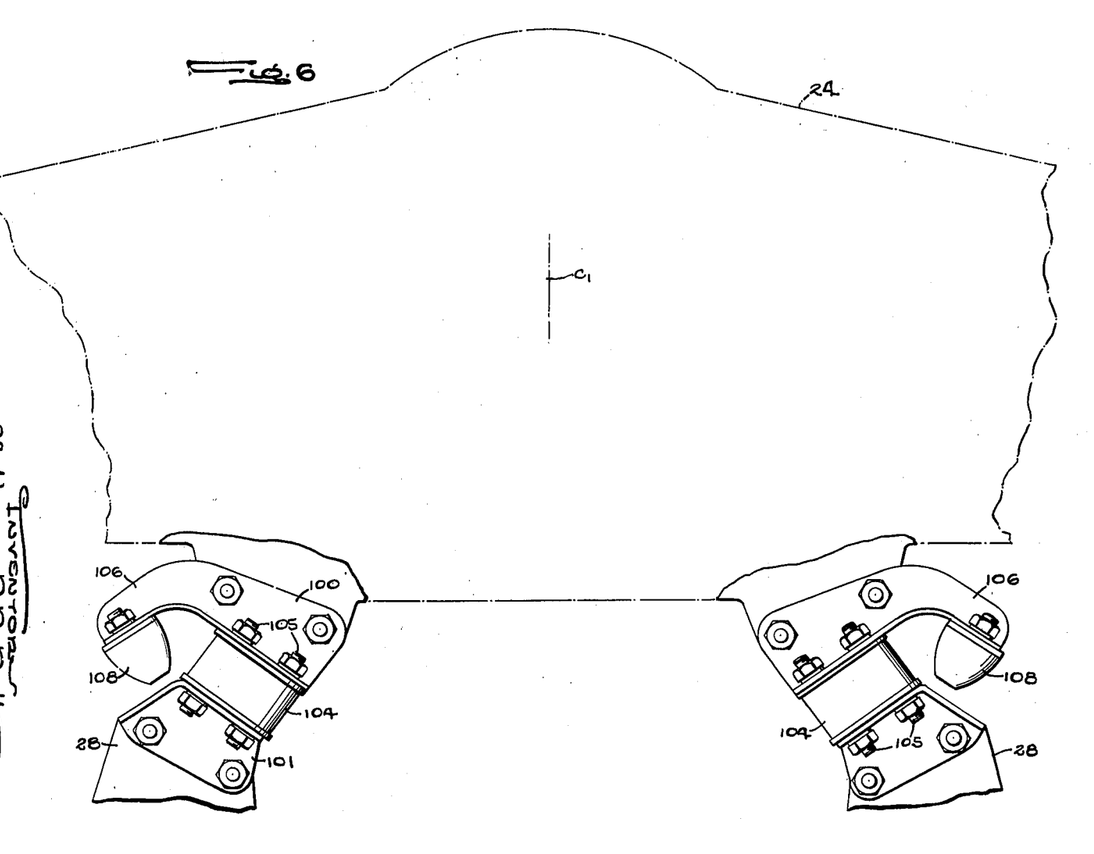

The vertical locations of the lugs 110 on the sides of the housing 51 are chosen so that the lugs are on a level with the fore and aft axis about which the power unit oscillates. This axis is located between the lugs at the point $C_2$. By this arrangement, the rubber sleeves 111 are stressed mainly in compression as the unit oscillates. It will be observed from Fig. 1 that the fore-and-aft axis of gyration of the power unit, lying along a line connecting the centers $C_1$ and $C_2$, slopes downwardly from front to rear. Preferably, this axis intersects the aft end of the rear output shaft 48 so that the latter is not shifted substantially as the unit rocks in a transverse direction. Little or no flexing of the universal joints in the propeller shaft is occasioned by such transverse rocking.

With the power unit 40 thus mounted by resilient means on the forward end of the frame 15, the transverse output shafts 46 and 47 are located properly for driving connection to the respective front half axles 20, and the rear output shaft 48 is properly positioned for connection to the forward universal joint of the propeller shaft 30. Not only is it intended that the power unit be floatably mounted with respect to the frame 15, but in accordance with the invention, the front suspension is organized to prevent transmission of vibrations between the wheels and the power unit.

The front suspension

The present front suspension is of the genus disclosed and claimed in the copending U. S. application of Claude Hill, Serial No. 332,793, filed January 23, 1953, and assigned to the assignee of the present invention. While reference may be had to such application for additional details, the suspension as here embodied will be described particularly with respect to improvements as to its coaction with the power unit.

Figure 3:
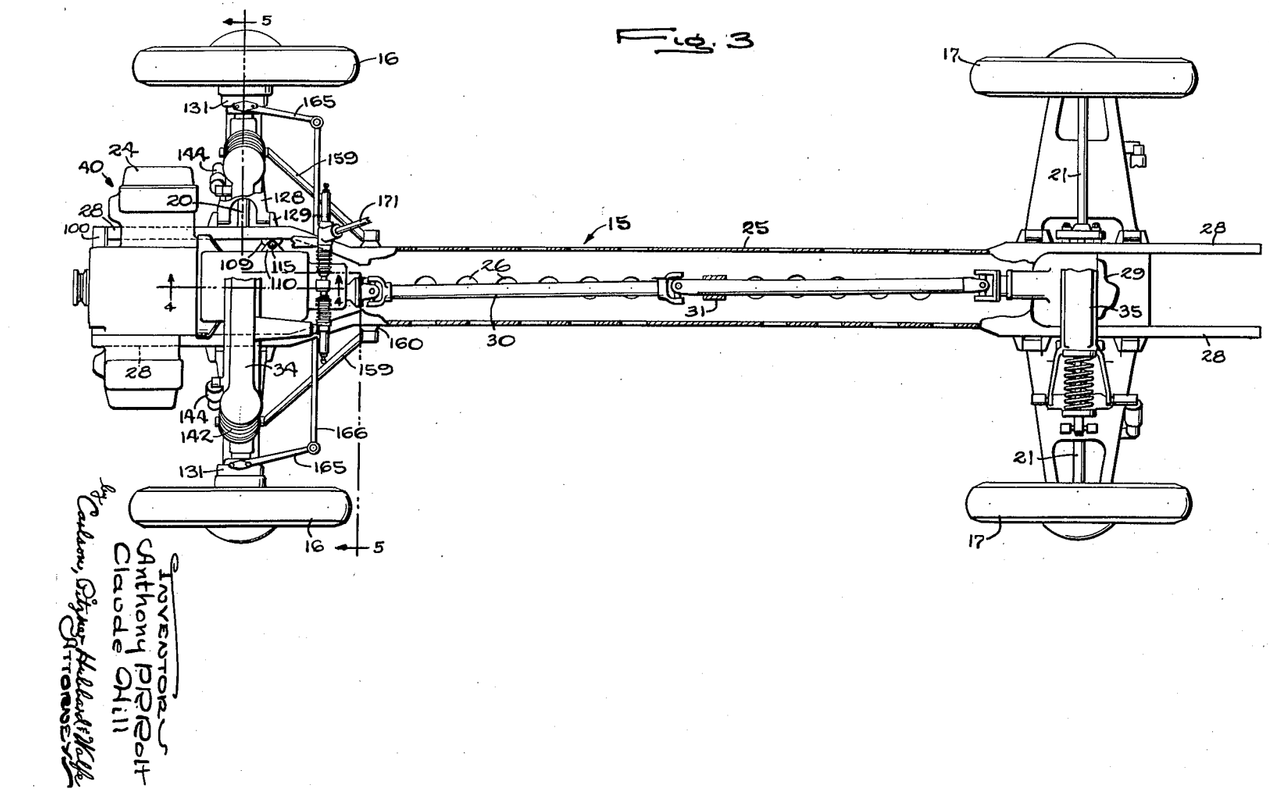
Fig. 3 is a plan view, partially in section, of the chassis shown in Fig. 1.
Figure 5:
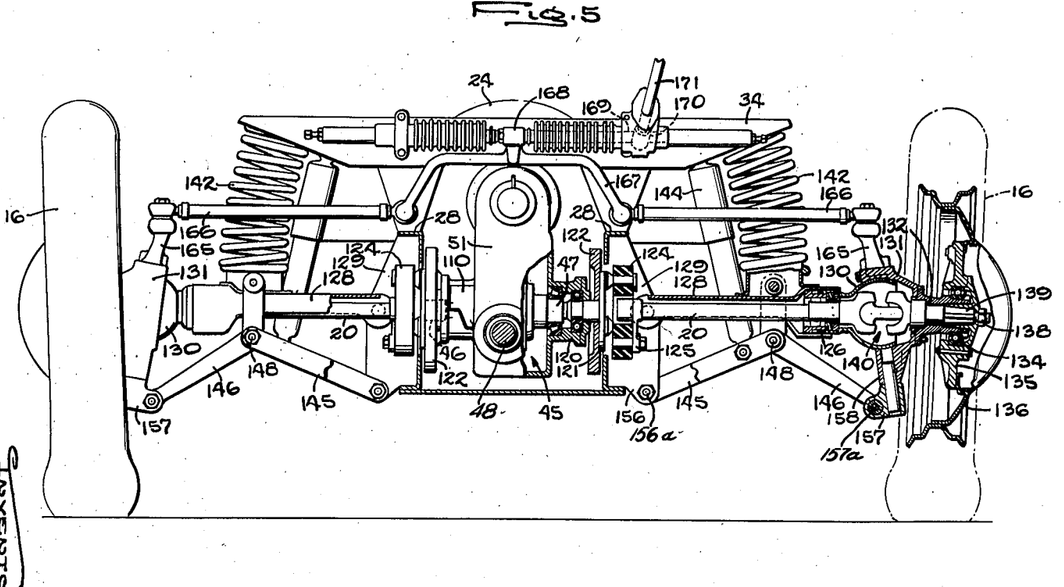
Fig. 5 is a partially sectioned rear elevation of the front wheel suspension for the automobile, taken substantially along the offset line 5—5 in Fig. 3.

Turning now to Figs. 3 and 5, the front suspension is seen to be identical for each front wheel 16 so that a description of one side will suffice for both. The output shaft 47 of the power unit 40 extends through a neck 120 on the housing 51, being journaled on suitable bearings and provided with a lubricant seal. The output shaft 47 has an end flange 121 adapted to receive a bolted annular disc 122 for a disc brake of any suitable known construction, the other parts of which are not shown. The inboard location of disc-type brakes includes their weight with that carried by the sprung frame, augmenting a low unsprung-to-sprung weight ratio.

The same bolts which secure the brake disc 122 to the flange 121 may extend through the apertured horn 28 to mount a deformable, resilient or rubber-like element, preferably a rubber disc 124 in alternate circumferentially spaced openings. A resilient-type universal coupling is formed by this rubber disc and a spider 125 rigidly secured to the inner end of the half axle 20. The spider, in turn, carries bolts engaged in the remaining holes of the rubber disc 124. Such a resilient universal joint may be of the commercial form known under the name "Lay-Rub" in England and described at page 160 of The Automotive Chassis, by P. M. Heldt of Nyack, New York, and published by him in 1945. It is capable of continued drive transmission with considerable angular deflection between the output shaft 47 and the half axle 20; and it permits slight endwise movement between these parts.

The outer end of the half axle 20 is supported for rotation in a self-aligning bearing 126 carried by the outer end of a U-shaped bracket or half casing 128 which is bifurcated at its inner end and pivoted on either side of the resilient coupling to brackets 129 provided on the frame (Fig. 3). The half axle 20 and its U-shaped protective casing 128 may therefore swing vertically relative to the frame, with the self-alining bearing 126 compensating for slight differences in their pivot centers.

The wheel 16 is mounted by a hub assembly which includes a hollow ball and socket casing having its inner semi-spherical member 130 rigidly secured to the outer end of the U-shaped casing 128 and its outer member 131 adapted to receive a stationary stub axle 132. The stub axle carries ball bearings 134 journaling a wheel hub 135 to which an annular disc 136 of the wheel 16 is bolted.

The hub 135 is slipped over and secured by a bolt 138 on a live stub axle 139 journaled within the stationary stub axle 134 and universally coupled to the outer end of the half axle 20 by a constant velocity universal joint 140, housed within the ball and socket assembly. A live connection is thus established between the power output shaft 47 of the power unit 60 to the wheel hub 135, permitting the entire wheel and half axle to swing vertically with respect to the frame, and the wheel to swing universally about the end of the half axle for steering purposes.

Spring means for the front suspension arrangement are provided by vertically disposed coil springs 142 interposed between an upstanding boss on the U-shaped casing 128 and a downwardly extending boss on the underside of the transverse frame member 34. A suitable damper or shock absorber 144, preferably of the telescoping type, is pivotally located between a point on the transverse member 34 and a control link to be described.

As the wheel and half axle 20 swing vertically relative to the vehicle frame, as for example on bumps or under various loadings of the vehicle, the point of ground engagement of the wheel would move laterally of the vehicle if the wheel were rigid on the outer end of the half axle. However, as previously described, the wheel is universally mounted at the outer end of the half axle not only for steering purposes but for controlled canting upon vertical deflection. In order to control the canting of the wheel and thus reduce lateral tire scrub, a control linkage for the suspension is provided in the form of two links 145 and 146 pivoted to a common point on a stub link 148 swingingly depending from the U-shaped casing 128. The first of these links 145 is pivoted at its inner end by a pin or bolt 156a inserted through a bracket 156 provided at the lower portion of the adjacent frame while the second link 146 has its outer end pivoted on a pin 157a in a bracket 157 rotatably carried by a downward extension 158 on the outer member 131 of the ball and socket assembly. This downward extension defines a steering pivot axis as explained below.

The control linkage for the half axle suspension is completed by a rearwardly extending brace 159 (Fig. 3) pivoted at its forward end to the same fore and aft axis on the U-shaped casing 128 as the swinging stub link 148. The brace 159 extends rearwardly and inwardly for pivot connection to a transverse stud (not visible) on a bracket 160 welded at a rearward point on the frame. This brace 159 restrains the axle 20 against swinging in a horizontal plane and takes braking or acceleration thrust from the half axle assembly while at the same time permitting vertical swinging movement on bumps.

During springing movement, for example, upward bounding of the wheel on a road bump, the half axle 20 swings upwardly about the universal coupling formed by the rubber disc 124, with the U-shaped casing 128 pivoting about its spaced connections to the brackets 129 (Fig. 3) on the frame. If the wheel 16 remained at right angles with the axle, the point of ground contact would move outwardly and increase the track width, causing lateral tire scrub and wear. However, such upward movement of the U-shaped casing 128 causes the two control links 145 and 146 to jackknife with respect to one another about their common pivot point, with the result that the second link 146 tilts the wheel inwardly at the bottom with respect to the outer end of the half axle. This produces a compensatory effect, reducing the tire scrub on such bumps as explained more particularly in the aforesaid copending application Serial No. 332,793. As a result of this compensatory action, i. e., the automatically controlled canting of the front wheel relative to the axle, the roll center of the vehicle is located advantageously to provide a smooth riding performance for the vehicle. A similar compensatory action obtains when the axle swings downwardly, for example, when the wheel encounters a depression or hole in the ground surface.

Figure 1:
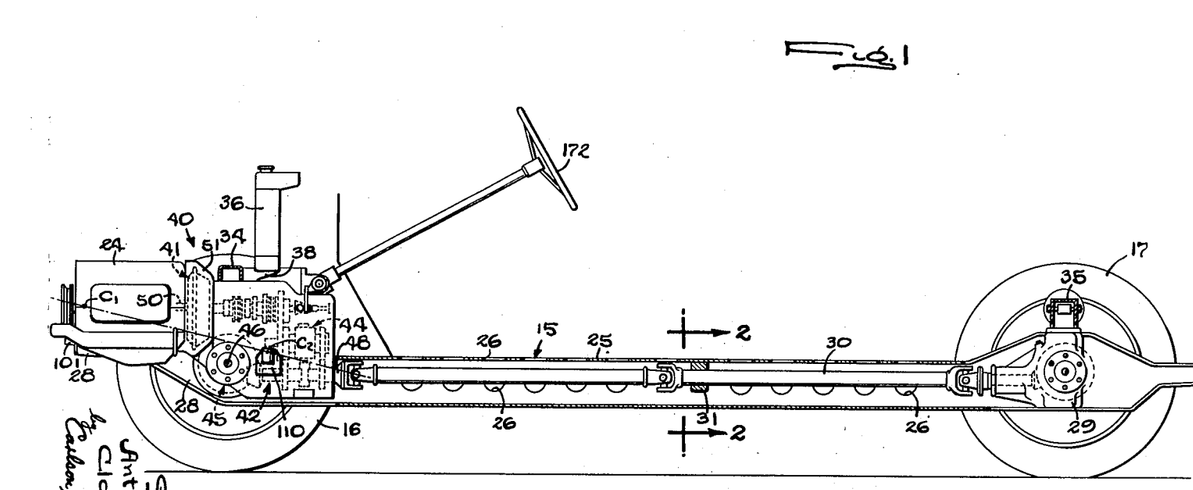
Figure 1 is a longitudinal vertical section of an automobile chassis embodying the features of the invention.

Steering of the front wheels is accomplished by pivoting the ball and socket assembly about the axis defined by the downward extension 158. A steering knuckle arm 165 is bolted to a pad on the top of the outer ball and socket member 131 and is universally connected at its rear end to a transverse tie rod 166. The inner end of the tie rod is universally connected to a link 167 which is carried at its midportion by a relay rod 168 having one end machined to provide a rack 169 engaged by a pinion 170 (not visible) at the lower end of a steering column 171 actuatable by a steering wheel 172 (Figs. 1, 4 and 5). The steering arrangement thus includes a rack and pinion mechanism extending transversely across the top of the power unit and operable from the driver's steering wheel to turn simultaneously both front wheels 16 for Ackerman type steering. The pivoting of the wheels takes place about the axis defined by the downward extension 158 on the outer socket member 131, which extension turns within the bracket 157 holding the outer end of the second controlling link 146. For further details of the steering mechanism, reference may be had to the copending application Serial No. 332,793, mentioned above.

*Coaction between the power unit and front suspension*

It will be apparent from the foregoing that the front wheels are independently suspended for vertical swinging movement yet adapted to be driven from the power unit by a universal coupling between the two output shafts 46, 47 and the swinging half axles 20. The power unit 40, which includes the engine 24, will inherently have certain mechanical vibrations or oscillations set up in it and these are desirably isolated from the wheels in order to avoid adverse effects upon steering or undue strain upon the power unit mounting means as the wheels encounter bumps. By virtue of the resilient mounting connections described, the power unit is "floated" so that it may vibrate relative to the frame substantially without transmitting its vibrations to the frame. The power unit 40 has freedom to shake or rock either about a fore and aft axis or a transverse axis relative to the frame 15. But during such shaking or rocking it is necessary that the drive to the front wheels and the propeller shaft continue. In the present arrangement the power unit 40 may rock about a fore and aft axis (lying between the centers $C_1$, $C_2$ in Fig. 1) while the drive to the half axles 20 continues by virtue of the universal coupling afforded by the resilient discs 124. The wheels, however, are not affected when their half axles 20 are thus rocked since the axles may swing within the limited degrees in their self-aligning bearings 126 while the U-shaped casings 128 remain stationary. Thus, even though the power unit 40 should rock considerably about a fore and aft axis the universal joints 140 may flex slightly while the axles 20 rock slightly in their self-alining bearing 126. The wheels are therefore unaffected. Because the power unit has a downwardly sloping fore and aft axis (see the line connecting $C_1$, $C_2$ in Fig. 1) about which it rocks laterally, the rear output shaft 48 is not appreciably displaced upon such rocking. And such displacement as does occur is accommodated by flexing of the universal joints in the propeller shaft 30, while the drive continues.

Horizontal vibrations of the power unit 40 are absorbed in the resilient coupling discs 124 so that such vibrations are substantially isolated from the wheels. Conversely, road shocks on the wheels are not transmitted to a harmful degree to the power unit 40. Should the power unit 40 rock or vibrate about a transverse axis, driving connection to the propeller shaft 30 may continue by virtue of the latter flexing slightly at one of its three universal joints. Not only, then, does the invention provide a compact power unit saving space and facilitating mounting, but it also provides that the unit be connected to drive a propeller shaft extending rearwardly and transversely extending front half axles. In addition, the invention provides, in combination with an advantageous front independent suspension, for the continuous drive of the front wheels while at the same time the wheels, frame, and power unit are substantially isolated from one another as regards the transfer of vibration.

We claim as our invention:

1. In a four wheel vehicle having a frame and independently suspended front and rear wheels, the combination comprising oppositely extending half axles, half casings and pivots about longitudinal axes connecting the casings to the frame for vertical rocking relative thereto, self-alining bearings journaling the outer ends of said axles in said casings, means drivingly coupling the outer ends of said half axles to the front wheels, a power unit having a pair of oppositely extending output shafts and a third output shaft extending at right angles to them, said power unit further including first and second differentials, means connecting the first differential to drive the second differential and said third output shaft, and means connecting said second differential to drive said pair of oppositely extending output shafts, rubber-like resilient means mounting said unit forward on said frame for isolating vibrations of the former from the latter, power transmitting means including deformable resilient universal couplings spaced axially along said axles from said casing pivots for drivingly connecting said pair of output shafts to the inner ends of respective ones of said axles and affording relative rocking of the shafts and axles about axes other than the pivot axes of said half casings as well as relative axial movements of said unit while continuously driving said front axles, means including a universally jointed, rearwardly extending drive shaft drivingly connecting said third output shaft to the rear wheels and permitting rocking of said unit longitudinally of said frame under continuous drive to said rear wheels.

2. In an automotive vehicle having a frame, the combination of a power unit including an engine and a transmission rigidly secured together, said transmission having first and second differentials and a rearwardly extending first output shaft and oppositely extending transverse second and third output shafts, said transmission also having means connecting said first differential to drive said second differential and said first shaft and means connecting said second differential to drive said second and third shafts, resilient means for mounting said unit forward on the frame with freedom for movement relative to it, a universally jointed propeller shaft coupled to said first output shaft, front wheel suspension means including transversely extending half axles, half casings pivoted at their inner ends to the frame about longitudinally extending axes, and self-alining bearings journaling the outer ends of said axles in said casings, and resilient universal couplings drivingly connecting said second and third output shafts to the inner ends of respective ones of said axles at locations displaced axially of the axles from the pivot connections of said half casings to the frame, whereby said axles may swing vertically with said casings relative to the frame, and said power unit may vibrate relative to the frame while said casings remain substantially stationary as said axles rock in said self-alining bearings.

3. In a four wheel automotive vehicle, the combination of a frame, a power unit including an engine and a transmission rigidly fastened together and having a rearwardly extending output shaft for driving the rear wheels of the vehicle and two output shafts extending in opposite transverse directions from the transmission, rubber-like resilient means for mounting said unit forward on the frame, a pair of steerable front wheels and means for independently suspending each at an opposite side of the frame including a half casing pivoted at its inner end to said frame about a longitudinal axis for vertical rocking relative to the frame, a half axle in said casing, a self-alining bearing journaling the outer end of the axle in the outer end of the casing, a hub assembly journaling the wheel, ball and socket means universally mounting said hub assembly at the outer end of said casing, a universal joint drivingly connecting the outer end of said axle to the wheel, a resilient universal drive coupling between the inner end of said half axle and the adjacent one of said two output shafts of said unit but spaced axially of said axle from the pivot connection of said half casing to the frame, and a control linkage including first and second links pivotally connected at their respectively opposite ends to the frame and hub assembly and at their adjacent ends to said casing, whereby said frame is substantially isolated from vibrations of the unit by virtue of the resilient mounting means, and said wheels are similarly substantially isolated by virtue of said resilient couplings and the freedom of said axle to rock in said self-alining bearing relative to said casing.

References Cited in the file of this patent

UNITED STATES PATENTS

| Number | Name | Date |
|---|---|---|
| 1,211,531 | Blomstrom | Jan. 9, 1917 |
| 1,693,111 | Fornaca | Nov. 27, 1928 |
| 1,853,058 | Johnson | Apr. 12, 1932 |
| 1,902,509 | Lee | Mar. 21, 1933 |
| 1,932,786 | Johnson | Oct. 31, 1933 |
| 1,947,213 | Meyer | Feb. 13, 1934 |
| 1,976,071 | Hoffman | Oct. 9, 1934 |
| 2,047,336 | Stout | July 14, 1936 |
| 2,053,575 | Olley | Sept. 8, 1936 |
| 2,084,080 | D'Aubarede | June 15, 1937 |
| 2,228,581 | Olen | Jan. 14, 1941 |
| 2,306,545 | Kummich | Dec. 29, 1942 |
| 2,631,681 | Utz et al. | Mar. 17, 1953 |
| 2,667,087 | Myers | Jan. 26, 1954 |

FOREIGN PATENTS

| Number | Country | Date |
|---|---|---|
| 459,247 | Germany | Apr. 30, 1928 |
| 631,905 | Great Britain | Nov. 11, 1949 |
| 483,147 | Italy | July 17, 1953 |